United States Patent [19]

Blum et al.

[11] Patent Number: 4,581,432

[45] Date of Patent: Apr. 8, 1986

[54] HEAT-CURABLE COMPOSITIONS WHICH ARE STORAGE-STABLE AT ROOM TEMPERATURE AND ARE BASED ON COMPOUNDS HAVING REACTIVE HYDROGEN ATOMS AND POLYISOCYANATES

[75] Inventors: Rainer Blum, Ludwigshafen; Frank Werner, Neustadt; Peter Horn, Heidelberg; Rolf Osterloh, Gruenstadt; Martin Welz, Bad Durkheim, all of Fed. Rep. of Germany

[73] Assignee: BASF Aktiengesellschaft, Ludwigshafen, Fed. Rep. of Germany

[21] Appl. No.: 673,973

[22] Filed: Nov. 23, 1984

[30] Foreign Application Priority Data

Nov. 29, 1983 [DE] Fed. Rep. of Germany ....... 3343124

[51] Int. Cl.$^4$ .............. C08G 18/80; C08G 18/79; C08G 18/30; C08G 18/14
[52] U.S. Cl. ........................ 528/45; 521/76; 521/155; 521/161; 528/44; 528/68; 528/85; 252/182
[58] Field of Search .............. 528/85, 68, 44, 59, 528/73, 45; 521/76, 155, 161

[56] References Cited

U.S. PATENT DOCUMENTS

| | | | |
|---|---|---|---|
| 4,089,835 | 5/1978 | König et al. | 528/68 |
| 4,093,569 | 6/1978 | Reischl et al. | 260/2.5 |
| 4,400,497 | 8/1983 | Blum et al. | 528/85 |
| 4,442,280 | 4/1984 | Groegler et al. | 528/54 |
| 4,483,974 | 11/1984 | Groegler et al. | 528/44 |

*Primary Examiner*—Herbert S. Cockeram
*Attorney, Agent, or Firm*—Joseph D. Michaels

[57] ABSTRACT

The invention relates to compositions which are storage-stable at room temperature and which can be heat-cured to form molded parts having polyurethane, polyurea, and polyisocyanurate groups, said composition containing (a) one or more polyols having a molecular weight of from 400 to 10,000 and a functionality of from 2 to 8,
(b) at least one polyfunctional compound having a molecular weight of 62 to 400 and being selected from the group consisting of aliphatic hydroxyl compound, cycloaliphatic hydroxyl compounds, aromatic amino compounds, or mixtures thereof, and
(c) an organic polyisocyanate which is present in the form of discrete particles, which are deactivated on their surfaces and are dispersed in the liquid component, and depending on the product needs,
(d) catalysts,
(e) blowing agents,
(f) reinforcing materials, and
(g) auxiliaries and additives, The single-component systems are used for the preparation of cellular or noncellular, optionally reinforced polyurethane, polyurea, and/or polyisocyanurate group-containing molded parts.

9 Claims, No Drawings

HEAT-CURABLE COMPOSITIONS WHICH ARE STORAGE-STABLE AT ROOM TEMPERATURE AND ARE BASED ON COMPOUNDS HAVING REACTIVE HYDROGEN ATOMS AND POLYISOCYANATES

BACKGROUND OF THE INVENTION

1. Field of the Invention

This invention relates to room temperature storage-stable, heat-curable mixtures containing polyisocyanates and active hydrogen compounds.

2. Description of the Prior Art

The preparation of optionally fiber-reinforced, cellular or noncellular molded parts or semi-finished products for such parts from compounds having reactive hydrogen atoms and polyisocyanates is described in numerous patents and patent applications.

In British patent GB No. 1,209,243, polyurethane foam molded parts are prepared by mixing organic polyisocyanates, compounds having reactive hydrogen atoms, blowing agents and catalysts at room temperature, the expandable reaction mixture is placed in a temperature-controlled, closable mold in large enough amounts to assure that the mold is completely filled out with the foam and such that the foam can expand and cure under compression.

In order to improve the mechanical properties of such molded foam parts, fibers or fiber mats as well as easily surrounded reinforcing pieces are placed in the mold and are embedded in the molded polyurethane part as it forms during the subsequent addition polymerization reaction and during foam expansion.

The disadvantage of this method is that the starting components must be added separately to the mixing unit and must be metered individually. Another disadvantage is that the addition polymerization begins directly upon mixing of the starting components. In particular, it is difficult to incorporate fiber materials which have a reinforcing effect, for example glass fiber mats, which must be completely saturated with the optionally expandable reaction mixture before the reaction begins.

These problems also could not be eliminated by using a two-component process, in which the compounds having reactive hydrogen atoms, catalysts, and optionally blowing agents, auxiliaries, and additives are usually combined to form the A component and the isocyanate group-containing compounds usually comprise the B component. The advantage of this procedure is that only two components need to to stored, metered in, and mixed. However, because of the rapidly climbing viscosity of the reaction mixture, long-fiber and planar reinforcing materials are not impregnated uniformly. This causes holes and voids, which sharply reduces the strength of the finished product.

Single-component polyurethane systems can be prepared by using capped polyisocyanates. These adducts are relatively thermal stable. Upon heating, the capping agent is cleaved off and the compound undergoes addition with reactive hydrogen atoms producing a thermally stable final product. This process is described, for example, in the *Kunststoff-Handbuch*, vol. VII, *Polyurethane* by R. Vieweg and A. Hochtlen, Munich: Carl Hanser Verlag, 1966, p. 11 ff., and it is used for the preparation of baked enamel as described in German published applications No. DE-A-26 12 638 (U.S. Pat. No. 4,068,086), No. DE-A-26 39 491 and No. DE-A-26 40 295.

The importance of such single-component systems is primarily determined by the type of capping agent which is used. With paint systems this agent evaporates and must be separated from the exhaust air, or it remains in dissolved form in the resulting high molecular weight addition polymerization product and affects its mechanical properties.

Various methods are described for overcoming these disadvantages. In the specifications of U.S. Pat. No. 3,475,200, storage-stable compositions are described which cure by heat to form polyurethane planar structures, coverings, or coatings. Said compositions are prepared from polyols, uretidione diisocyanates which melt at temperatures in excess of 100° C., and chain extenders which melt at temperatures in excess of 80° C., whereby at least 80 percent of the total amount of particles of the uretidione diisocyanate and the chain extender must be less than 30 $\mu$m in diameter.

Uretidione group- and end-capped isocyanate group-containing organic compounds are prepared as described in GB 1,488,631 by reacting a uretidione group-containing polyisocyanate with an excess amount of a chain extender having a molecular weight of from 18 to 300 and with from 2 to 3 reactable groups relative to the isocyanates.

The capping agent, which is liberated during crosslinking, also remains in the addition polymerization product in this case.

U.S. Pat. No. 3,248,370 describes thermoplastic polyurethanes prepared from difunctional hydroxyl compounds, uretidione diisocyanate, and a second diisocyanate as well as glycol or water as the chain extender at temperatures under 100° C., whereby the starting components are reacted in such amounts that nearly all the free isocyanate groups are consumed.

The uretidione group-containing process products described in the cited publications are, according to the examples, generally based on dimeric toluene diisocyanates and already in the non-cured condition they represent high molecular-weight, thermoplastic precursors having reactive groups.

Not until 140° C. is exceeded do the precursors react—as they soften or melt—to form high molecular-weight or crosslinked polymerization products. This is because the uretidione group is sufficiently reactive at these temperatures and the reactants, which are initially fixed in the polyurethane matrix, can come in contact due to diffusion processes and can therefore undergo addition polymerization.

On the other hand, if the starting components cited in the above-referenced publications, for example, dimeric toluene diisocyanate, polyester polyols, and polyether polyols are mixed with or without low molecular weight chain extenders and without premodification, high molecular weight products are obtained which can only be reacted by using elaborate processing techniques involving the crosslinking of the uretidione groups to form crosslinked polyurethanes. In some cases, the use of such techniques is completely impossible. Because of the relatively low solubility and the relatively high melting point (approximately 150° C.), reaction mixtures having a medium-length or even relatively long processing time can be prepared from dimeric toluenediisocyanates and conventional polyols and chain extenders at an index of 100. However, after the necessary catalysts have been added, these mixtures are no longer storage-stable at room temperature.

Canadian Patent No. CA 1,147,123 described a process for the preparation of fiber-reinforced molded parts in which the polyurethane compositions based on high melting point polyisocyanates, for example dimeric toluene diisocyanates, are reacted at specific quantitative ratios of the starting components. The disadvantage here is that the polyurethane compositions are only storage-stable for from several hours to a maximum of a few days.

Solvent-free molding compositions of a hydroxyl group-containing prepolymer having from 0.5 to 7 weight percent free hydroxyl groups and from 5 to 20 weight percent urethane groups, polyisocyanates having a melting point in excess of 100° C., and organic or inorganic fillers in specified quantitative ratios are described in U.S. Pat. No. 4,251,428. The disadvantage of this method is that only special hydroxyl group-containing prepolymers are suitable as the compounds having reactive hydrogen atoms for preparing the molding compositions and the products are only moderately storage-stable.

The U.S. Pat. No. 4,251,427 also relates to coating compositions which contain a polyisocyanate having a melting point in excess of 100° C., a hydroxyl group-containing prepolymer prepared from a polyisocyanate, a partially branched polyether polyol, a glycol having a molecular weight of from 62 to 250, and a compound having at least two amino groups, a molecular sieve of the sodium aluminum silicate type, and an activator. If the coating composition is not prepared from pre-extended polyols, the composition is not storage-stable when dimeric toluenediisocyanates are used in the presence of catalysts.

Long-term storage-stable, heterogeneous single-component systems of polyols and diphenylmethane uretidione diisocyanates are the subject of European published application EP-A-71898.

In addition to specific undesired properties, for example high viscosities, the high temperature required to cleave the capping agent and to achieve crosslinking, the described molding and coating compositions also have the disadvantage that only very specific polyisocyanates with very specific polyols can be combined to prepare said compositions.

Storage-stable, heat-curable compositions suitable for use as coating and adhesive bonding agents as well as sealants, in which the isocyanate is present in form of discrete particles in the polyol and whose particle surfaces are deactivated, is also described in European published application No. EP-A-62780. As befits this range of applications, however, this process only results in flexible, adhesive products, which are not suitable for the preparation of molded parts due to their inadequate mechanical properties after curing.

SUMMARY OF THE INVENTION

The need met by the claimed invention was to develop heat-curable compositions which are storage-stable at room temperature and are based on compounds having reactive hydrogen atoms and polyisocyanates which could be processed into cellular or noncellular, optionally reinforced molded parts having good mechanical properties, said processing being cost-effective and using a commercially feasible process. When reinforcing materials are used, it should also be possible to use said materials at high content levels in the cured molded part, whereby it must be assured that the reinforcing material can be completely wetted with the composition prior to beginning the additional polymerization.

Thus, the subject of the invention is heat-curable compositions for producing molding parts containing polyurethane, polyurea, and/or polyisocyanurate groups, said compositions containing (a) one or more polyols having a molecular weight of from 400 to 10,000 and a functionality of from 2 to 8, (b) at least one polyfunctional compound having a molecular weight of 62 to 400 and being selected from the group consisting of aliphatic hydroxyl compounds, cycloaliphatic hydroxyl compounds, aromatic amino compounds, or mixtures thereof, and (c) an organic polyisocyanate, which is present in the form of discrete particles which are deactivated on their surfaces and are dispersed in the liquid component, and, depending on processing and product needs, (d) catalysts, (e) blowing agents, (f) reinforcing materials, and (g) auxiliaries and additives.

The compositions claimed in the invention, which are storage-stable at room temperature and are heat-curable, are multiple-phase molding compositions which are flowable, paste-like, or are easily converted to a molten phase at temperatures below their crosslinking temperature. A single-component system permits the reinforcing materials to be easily and completely wetted.

DESCRIPTION OF THE PREFERRED EMBODIMENTS

The following must be noted regarding the basic components for the compositions claimed in the invention as well as for their preparation and use to produce polyurethane, polyurea, and/or polyisocyanurate group-containing, optionally reinforced, dense or cellular molded parts:

(a) preferably linear and/or branched polyester polyols and/or polyether polyols having molecular weights from 400 to 10,000, preferably from 1,000 to 8,000, and more preferably from 1200 to 6000, are used as the polyols. However, other hydroxyl group-containing polymers having the cited molecular weights can also be used, for example, polyester amides, polyacetals such as polyoxymethylene and butanediol formals, and polycarbonates, in particular aliphatic polycarbonates prepared from diphenylcarbonate and 1,6-hexanediol by means of transesterification.

Suitable polyester polyols having a functionality of from 2 to 3.5, preferably from 2 to 3, and can be prepared, for example, using known methods from organic dicarboxylic acids, preferably aliphatic dicarboxylic acids having from 2 to 12, preferably 4 to 6 carbon atoms in the alkylene radical, and from polyvalent alcohols, preferably diols having from 2 to 6 carbon atoms. Typical organic dicarboxylic acids are: aliphatic dicarboxylic acids such as succinic, glutaric, pimelinic, undecanedicarboxylic acid, dodecanedicarboxylic acid, and, preferably, adipic acid and mixtures of succinic, glutaric, and adipic acid and aromatic dicarboxylic acids such as phthalic acid, isophthalic acid, and terephthalic acid. However, dicarboxylic acid derivatives can also be used, for example dicarboxylic acid anhydrides, dicarboxylic acid esters of alcohols having from 1 to 4 carbon atoms, dicarboxylic acid dichlorides, and dimerized and trimerized unsaturated fatty acids. Examples of di- and polyvalent, preferably divalent, alcohols, are: 1,2- and 1,3-propanediol, 1,4-butanediol, 1,5-pentanediol, 1,6-hexanediol, 1,10-decanediol, dipropylene glycol, glycerine, trimethololpropane, and preferably 1,2-ethanediol, ethylene glycol, 1,4-butanediol, 1,6-hexanediol, and mixtures of 1,4-butanediol, 1,5-pentanediol, and 1,6-hexanediol. In addition, alkanolamines such as triethanolamine, triisopropanolamine, diethanolamine, etc. can be used as the polyvalent alcohols. Polyester polyols from lactones, for example, $\epsilon$-Caprolactone, or hydroxy carboxylic acids such as $\omega$-hydroxycaproic acid can be used, in particular when they contain additional components to decrease their high crystallinity, for example, diethylene glycol or 1,4-butanediol. When polyfunctional, in particular trifunctional, alcohols are used to prepare the polyester polyols, the concentration of such alcohols must be selected in such a manner that the functionality of the resulting polyester polyols is maximum 3.5, preferably from 2 to 3.0.

Desirable results were achieved with such polyester polyols, so that their use is preferred, through the condensation polymerization of a dicarboxylic acid mixture which contains the following based on the total weight of the cited dicarboxylic acids: 20 to 35 weight percent succinic acid, 35 to 50 weight percent glutaric acid, and 20 to 32 weight percent adipic acid, and alcohol mixtures of 1,2-ethanediol/1,4-butanediol, 1,2-ethanediol/diethylene glycol, 1,2-ethanediol/trimethylolpropane, diethylene glycol/trimethylolpropane, 1,2-ethanediol/triisopropanolamine, and diethylene glycol/triisopropanolamine, and adipic acid, and a mixture of 1,4-butanediol, 1,5-pentanediol, and 1,6-hexanediol.

The polyester polyols have molecular weights from 1000 to 3000, preferably from 1200 to 2500.

However, polyether polyols are preferably used as the polyols, whereby said polyether polyols are prepared using known methods, for example, by means of anionic polymerization with alkali hydroxides such as sodium and potassium hydroxide, or with alkali alcoholates such as sodium methylate, sodium or potassium ethylate, or potassium isopropylate as catalysts, or means of cationic polymerization with Lewis acids such as antimony pentachloride, boronfluoride etherate, etc. or bleaching earth as catalysts from one or more alkylene oxides having from 2 to 4 carbon atoms in the alkylene radical and from an initiator which contains from 2 to 8, preferably 2 to 4, reactive hydrogen atoms.

Suitable alkylene oxides are, for example, tetrahydrofuran, 1,3-propylene oxide, 1,2-respectively 2,3-butylene oxide, styrene oxide, epichlorohydrin, and, preferably ethylene oxide and 1,2-propylene oxide. The alkylene oxides can be used individually, alternately one after another, or as mixtures. Typical initiators are: water, organic dicarboxylic acids such as succinic acid, adipic acid, phthalic acid, and terephthalic acid, aliphatic and aromatic, optionally N-mono-, N-N-, and N,N,N'-dialkyl-substituted diamines having from 1 to 4 carbon atoms in the alkyl radical, as well as, optionally, mono- and dialkyl-substituted ethylenediamine, diethylenetriamine, triethylenetetramine, 1,3-propylenediamine, 1,3-respectively, 1,4-butylenediamine, 1,2-, 1,3-, 1,4-, 1,5-, and 1,6-hexamethylenediamine, phenylenediamine, 2,4- and 2,6-toluenediamine, and 4,4'-, 2,4'-, and 2,2'-diaminodiphenylmethane.

Typical initiators also include alkanolamines such as ethanolamine, diethanolamine, N-methyl and N-ethylethanolamine, N-methyl and N-ethyldiethanolamine, and triethanolamine, ammonia, hydrazine, and hydrazides. Preferably used are polyvalent, in particular di- and/or trivalent alcohols such as ethylene glycol, 1,2-propylene glycol and 1,3-propylene glycol, diethylene glycol, dipropylene glycol, 1,4-butylene glycol, 1,6-hexamethylene glycol, glycerine, trimethanolpropane, pentaerythritol, sorbitol, and succrose.

The polyether polyols have molecular weights from 400 to 10,000, preferably from 1000 to 8000, and more preferably from 1200 to 6000. As with the polyester polyols, they can be used individually or in the form of mixtures. In addition, they can be mixed with the polyester polyols as well as with the hydroxyl group-containing polyesteramides, polyacetals, and polycarbonates.

(b) Polyvalent compounds having molecular weights from 62 to 400, preferably from 62 to 300 and having hydroxyl groups bonded to aliphatic and/or cycloaliphatic radicals and/or amino groups bonded to aromatic radicals are suitable for use as the crosslinking agents or chain extenders familiar to polyurethane chemistry. These compounds have a functionality of from 2 to 8, preferably from 2 to 3, and can be used individually or in the form of mixtures of the same type or of different types. Typical examples of such compounds are: polyvalent alcohols having primary and/or secondary hydroxyl groups bonded to aliphatic and/or cycloaliphatic radicals, such as 1,2-ethanediol, 1,3-propanediol, and 1,2-propanediol, 2,2-dimethyl-1,3-propanediol, 1,4-, 1,3-, and 2,3-butanediol, 1,5-, and 2,5-pentanediol, 1,6-hexanediol, 1,4-bis-hydroxymethyl-cyclohexane, 1,4-dihydroxycyclohexane, 1-hydroxymethyl-4-hydroxycyclohexane, 4,4'-dihydroxy-dicyclohexylmethane, 2,2-bis(4-hydroxycyclohexyl)propane, trimethylolethane, trimethylolpropane, 1,2,6-hexanetriol, glycerine, pentaerythritol, quinite, Mannitol, sorbitol, formose, formite, and 1,4-dihydroxyethylhydroquinone. In addition, polyvalent alcohols containing bonded tertiary amino groups are suitable, for example, N-methyldiethanolamine, triethanolamine and N,N'-bis-hydroxyethylpiperazine. Particularly effective as initiators and therefore preferred are: di- and trivalent alcohols such as 1,2-ethanediol, 1,4-butanediol, and 1,6-hexanediol, glycerine, and trimethylolpropane, and low molecular weight hydroxyl group-containing polyoxyalkylene polyethers based on ethylene oxide and/or 1,2-propylene oxide and the previously cited polyvalent alcohols or aliphatic diamines having molecular weights from 60 to 116.

Aromatic polyamines are particularly suited as the polyfunctional compounds, as well as amino group-containing heterocyclics, whose heterocyclic radical has an aromatic character.

Primary aromatic diamines are preferably used as the aromatic amines to prepare the composition claimed in the invention.

Aromatic diamines whose primary amino groups do not exhibit reduced reactivity toward poly-isocyanates due to electron-attracting substituents are preferable. Also advantageous are aromatic diamines whose primary amino groups are sterically hindered. Particularly well suited are primary aromatic diamines of the type cited which are liquid at room temperature and which are completely or at least partially miscible with the polyols (A) under the processing conditions. For example, metaphenylenediamine and/or, preferably, alkyl-substituted meta-phenylenediamines of formulas

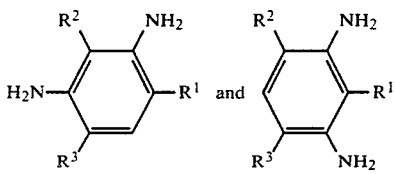

have proven to be effective. In these structures $R^1$ is a hydrogen atom or a linear or branched alkyl radical having from 1 to 10, preferably 1 to 6 carbon atoms, and $R^2$ and $R^3$ are identical or different alkyl radicals having from 1 to 3 carbon atoms, for example, methyl, ethyl, propyl, or isopropyl radicals. Particularly suited are those alkyl radicals $R^1$ whose branching point is located at the $C^1$ carbon atom. In addition to hydrogen, the following may be cited as typical $R^1$ alkyl radicals: methyl, ethyl, n- and isopropyl, butyl, hexyl, octyl, decyl, 1-methyloctyl, 2-ethyloctyl, 1-methyloctyl, 2-ethyloctyl, 1-methyloctyl, 2-ethyloctyl, 1-methylhexyl, 1,1-dimethylpentyl, 1,3,3-trimethylhexyl, 1-ethylpentyl, 2-ethylpentyl, and, preferably, cyclohexyl, 1-methyl-n-propyl, tert-butyl, 1-ethyl-n-propyl, 1-methyl-n-butyl, and 1,1-dimethyl-n-propyl radicals.

Typical alkyl-substituted m-phenylenediamines which may be used are: 2,4-dimethyl-, 2,4-diethyl-, 2,4-diisopropyl-, 2,4-diethyl-6-methyl-, 2-methyl-4,6-diethyl-, 2,4,6-triethyl-, 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-6-(1,1-dimethyl-n-propyl)-, and 2-(1-methyl-n-butyl)-4,6-dimethyl-1,3-diphenylenediamine.

In addition, diaminodiphenylmethanes have proven to be effective, for example, 4,4'- and/or 2,4'-diaminodiphenylmethane, 3,3'-di- and 3,3',5,5'-tetra-n-alkyl-substituted 4,4'-diaminodiphenylmethanes such as 3,3'-dimethyl-, 3,3',5,5'-tetramethyl-, 3,3'-diethyl-, 3,3',5,5'-tetraethyl-, and 3,3',5,5'-tetra-n-propyl-4,4'-diaminodiphenylmethane.

Preferably diamino-diphenylmethances of formula

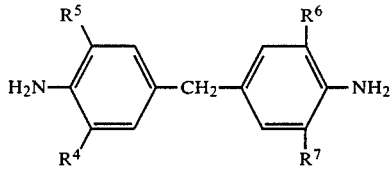

are used. Here, $R^4$, $R^5$, $R^6$ and $R^7$ are identical or different and are a methyl, ethyl, propyl, isopropyl, sec-butyl, and tert-butyl radical, whereby at least one of the raidcals must be an isopropyl or sec-butyl radical. The 4,4'-diamino-diphenylethanes can also be used in mixtures with osimers of formulas

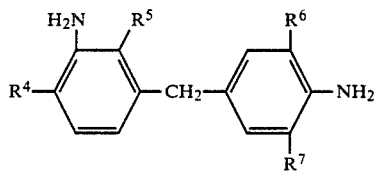

and

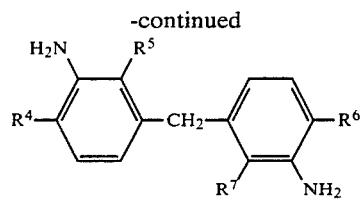

whereby $R^4$, $R^5$, $R^6$ and $R^7$ have the meaning cited above.

Typical examples are 3,3',5-trimethyl-5'-isopropyl-, 3,3',5-triethyl-5'isopropyl-, 3,3',5-trimethyl-5'-sec-butyl-, 3,3',5triethyl-5'sec-butyl-4,4'-diaminodiphenylmethane, 3,3'-dimethyl-5,5'-diisopropyl-, 3,3'-diethyl5,5'-diisopropyl-, 3,3'-dimethyl-5,5'-di-secbutyl-, 3,3'-diethyl-5,5'-di-sec-butyl-, 3,5-dimethyl-3',5'-diisopropyl-, 3,5-diethyl-3',5'-diisopropyl-, 3,5-dimethyl-3',5'-di-secbutyl-, 3,5-diethyl-3',5'-di-sec-butyl-4,4'-diaminodiphenylmethane, 3-methyl-3',5,5'-triisopropyl-, 3-ethyl-3',5,5'-triisopropyl-, 3-methyl-3',5,5'-tri-sec-butyl-, 3-ethyl-3',5,5'-tri-sec-butyl-4,4'-diamino-diphenylmethane, 3,3'-diisopropyl-5,5'-di-sec-butyl-, 3,5'diisopropyl-3',5'-di-sec-butyl, 3-ethyl-5-secbutyl-3',5'-diisopropyl-, 3-methyl-5-tertbutyl-3',5'-diisopropyl-, 3-ethyl-5-sec-butyl-3'-methyl-5'tert-butyl-, 3,3',5,5'-tetraisopropyl- and 3,3',5,5'-tetra-sec-butyl-4,4'-diaminodiphenylmethane.

Preferably used are the following primary aromatic alkyl-substituted phenylenediamines and diaminodiphenylmethanes: 2,4-diethyl-, 2,4-dimethylphenylenediamine-1,3, 2,4-diethyl-6-methyl-, 2-methyl-4,6-diethylphenylenediamine-1,3, 2,4,6-triethylphenylenediamine-1,3, 2,4-dimethyl-6-tert.butyl-, 2,4-dimethyl-6-isooctyl- and 2,4-dimethyl-6-cyclohexylphenylenediamine-1,3 as well as 3,3'-diisopropyl-3,5-dimethyl-3',5'-diisopropyl- and 3,3',5,5'-tetraisopropyl-4,4'-diaminodiphenylmethane.

The primary aromatic diamines can be used individually or in the form of mixtures, for example, alkyl-substituted 1,3-phenylenediamines, diaminodiphenylmethanes, 3,3'-di- and/or 3,3',5,5'-tetra-alkyl-substituted 4,4'-diaminodiphenylmethanes. In addition, the primary aromatic diamines can be mixed with a maximum of 50 weight percent, based on the total weight, primary aromatic tri- to pentamines, for example polyphenylpolymethylene polyamines, whereby the aromatic polyamines are preferably also substituted with an alkyl radical with at least one ortho position relative to the amino groups. Typical secondary aromatic diamines are: N,N'-dialkyl-substituted aromatic diamines, which optionally may be substituted on the aromatic ring by alkyl radicals, having from 1 to 20, preferably 1 to 4 carbon atoms in the N-alkyl radical, for example N,N'-diethyl-N,N'-di-sec-pentyl-, N,N'-di-sec-hexyl-, N,N'-di-sec-decyl-, N,N'-dicyclohexyl-p-or-m-phenylenediamine, N,N'-dimethyl-, N,N'-diethyl-, N,N'-diisopropyl, N,N'-di-sec-butyl-, N,N'-dicyclohexyl-4,4'-diaminodiphenylmethane, and N,N'-di-sec-butylbenzidine. The polyfunctional compounds (B) or their mixtures are used to prepare the composition claimed in the invention in amounts from 1 to 50 parts by weight, preferably from 1 to 20 parts by weight, and more preferably from 2 to 10 parts by weight, based on 100 parts by weight polyol (A) or polyol mixture.

(c) The following may be used as the organic polyisocyanate: aliphatic, cycloaliphatic, arylaliphatic, and preferably aromatic polyfunctional isocyanate. Typical examples are: alkylene diisocyanate having from 2 to 12, preferably 4 to 6, carbon atoms in the alkylene radical such as 1,2-ethane diisocyanate, 1,4-butane diisocyanate, 2-ethyl-1,4-butane diisocyanate, 1-methyl-1,5-pentane diisocyanate, 1,6-hexane diisocyanate, 2-ethyl-1,6-hexane diisocyanate, 1,8-octane diisocyanate, 1,10-decane diisocyanate, and 1,12-dodecane diisocyanate, cycloaliphatic diisocyanates such as 1,3-cyclohexane diisocyanate and 1,4-cyclohexane diisocyanate as well as various mixtures of these monomers, 1-isocyanato-3,3,5-trimethyl-5-isocyanatomethyl cyclohexane, 2,4- and 2,6-hexahydrotoluene diisocyanate as well as various mixtures of these isomers, 4,4'-, 2,2'-, and 2,4'-dicyclohexylmethane diisocyanate as well as various mixtures comprised of at least two of these isomers; arylaliphatic diisocyanates such as 1,2-, 1,3- and 1,4-xylene diisocyanate, and aromatic polyisocyanates such as 4,4'-, 2,4'- and 2,2'-diisocyanatodiphenyl-methane, and the corresponding mixtures of at least two of these isomers, 2,4- and 2,6-diisocyanatotoluene and the corresponding isomer mixtures, 1,5-diisocyanatonaphthalene, polyphenylpolymethylene polyisocyanate and mixtures of the isomeric diisocyanatodiphenylmethanes and polyphenylpolymethylene polyisocyanate. The cited di- and polyisocyanates can be used individually or in the form of mixtures.

So-called modified polyfunctional isocyanates are also suitable, in other words products obtained through the chemical reaction of the above di- and/or polyisocyanate. Typical examples are di- and/or polyisocyanates containing esters, urea, biuret, allophanate, carbodiimide, and preferably urethane, uretidione, and/or isocyanurate groups.

Particularly successful and therefore preferred for use are solid di- and/or polyisocyanates which are solid at room temperature, such as 4,4'diisocyanatodiphenylmethane and 1,5-naphthalene diisocyanate and di-and/or polyisocyanates which are modified with urethane, uretidione, and/or isocyanurate groups, and are based on 1,6-hexane diisocyanate, 1-isocyanato-3,3,5-trimethyl-5-isocyanatomethylcyclohexane, 2,4'-, 4,4'-diisocyanatodiphenylmethane, and preferably, 2,4- and/or 2,6- toluene diisocyanate.

Modified polyisocyanates of the preferred type are, preferably, addition products of diisocyanatotoluene and trimethylolpropane, trimerized (isocyanurate group-containing) diisocyanatotoluene and diisocyanatodiphenylmethanes, and dimerized (uretidione group-containing) diisocyanatotoluenes, 4,4'- and/or 2,4'-diisocyanato- diphenylmethanes.

The compositions claimed in the invention of one or more polyols (a), at least one polyfunctional compound (b), and polyisocyanates (c), contain the polyisocyanates in the form of discrete particles having particle diameters from 0.1 to 150 μm, preferably from 1 to 50 mm dispersed in the liquid component.

In order to prevent an addition polymerization reaction between the polyisocyanates (c) and the polyols (a) and the polyfunctional compounds (b) at room temperature, the dispersed polyisocyanate particles are deactivated on their surfaces. The deactivating agent used for this purpose is preferably selected such that it is linked to the surface of the polyisocyanate particle by chemical or physical forces and so that in this way a phase separation is produced between the polyisocyanate particles and the remaining components, in particular the polyols (a) and the polyfunctional compounds (b).

In the chemical deactivation, from 0.01 to 20, preferably from 0.1 to 10 and more preferably from 0.3 to 5, equivalent percent of the total available isocyanate groups are reacted with the deactivating agent.

To do this, the deactivating agent can be added to the mixtures at the required equivalence ratios. Another suitable method is a process in which the deactivating agent is added in amounts in excess of the required equivalence ratio.

After the surface of the dispersed phase has been fully occupied by the deactivating agent, the deactivating reaction stops.

The following deactivating agents may be used: water, mono- and polyamines, mono- and polyalcohols. Particularly well suited are relatively long chained mono-amines, for example stearylamine, which react to form a kind of grafted-on emulsifier. Higher molecular weight aliphatic polyamines, for example polyamidamines, and hydroxyl-terminated polymers, for example hydroxyl-terminated polybutadiene oils, react to form grafted-on protective colloids. Particularly suitable for deactivating the isocyanate groups on the surface of the polyisocyanate particles, in other words, for stabilizing the isocyanate/-polyol dispersion, are also reactions which produce urea or polyurea structures on the isocyanates, since such structures are insoluble in most polyols and organic solvents. Reagents forming such ureas or polyureas are water and primary or secondary amines, whereby short-chained diamines such as ethylene diamine or propylene diamine are preferred. The polyureas formed from these short-chained diamines are more organophobic than those formed from longer chained diamines and in many cases they therefore have a more stabilizing effect.

The following may also be used as deactivating agents: compounds containing carboxyl groups such as homo-and copolymers of acrylic acid, methacrylic acid, maleic acid, and other polymerizable acids, acid products of condensation polymerization reactions such as polyesters prepared with an excess of acid, acid polymers obtained through the alcoholysis of the adducts of maleic acid anhydride on unsaturated polymers, for example linseed oil or polybutadiene oil; compounds which contain phenolic hydroxyl compounds, such as phenol, cresol, cardanol, p-tert-butylphenol, 2,2-bis[4-hydroxyphenyl]propane, and the non-crosslinked condensation products of these phenol bodies with aldehydes, for example formaldehyde, which are also termed resoles.

Amide-group containing compounds such as soluble polyamides and polymers of acrylamide and methacrylamide or copolymers of acrylamide and/or methacrylamide with acrylate acid esters and/or methacrylic acid esters; polyhydrazides, obtained through the hydrazinolysis of polyacrylates and their preparation, for example as described by M. Hartmann, R. Dowbenko, U. T. Hockswender in *Organic Coatings +Applied Polymer Science* vol. 46 (1982), pp. 429, 432.

Also suitable are compounds having alcoholic hydroxyl groups, provided that their solubility in water is less than 1 weight percent.

The cited deactivating agents generally have molecular weights from 18 to 1 million, preferably from 18 to 5000.

Preferably used as deactivating agents are: primary and secondary aliphatic amines, water or compounds containing carboxyl, phenolic hydroxyl, hydrazide, amide, or alcoholic hydroxyl groups, whereby the compounds with alcoholic hydroxyl groups must have a solubility in water of less than 1 weight percent.

The preparation of the compositions is best performed using conventional dispersing and mixing equipment. In preparing this mixture the polyisocyanate is preferably dispersed in the polyols at temperatures under 40° C., more preferably at temperatures from 0° to 25° C., in polyfunctional compounds (b) in the mixtures of polyols (a) and polyfunctional compound (b) or in polyols (a), whereby the polyol either already contains the total amount of one or more of the deactivating agents or at least one of the deactivating agents is incorporated in the composition shortly after the dispersion operation. Of course, both types of processes can be combined, whereby the polyol, for example, can already contain part of the deactivating agent, while the other part of the deactivating agent or of a different deactivating agent is added to the composition after dispersion of the polyisocyanate.

This so-called in-situ stabilization is preferably undertaken when the deactivating agent has a significantly greater reactivity relative to the polyisocyanates than does the components (a) and/or (b) which forms the coherent phase. Since polyol isocyanates react significantly faster with primary amines than with polyols having primary hydroxyl groups, by stirring in polyisocyanates, preferably polyisocyanates in powder form such as 1,5-naphthalene diisocyanate, 4,4'-diisocyanatodiphenylmethane, dimerized uretidione group-containing diisocyanatodiphenylmethanes, and preferably dimerized uretidione group-containing diisocyanatotoluenes into polyols containing aliphatic polyamines as the deactivating agent, preferably polyether polyols, compositions can be obtained directly which are storage-stable at room temperature.

An additional advantage of this process is due to the fact that urea compounds form on the surface of the polyisocyanate particles. These urea compounds react at higher temperatures with additional polyisocyanate to form biuret group-containing polyaddition products—in other words, the deactivating agent is incorporated in the high molecular weight polyaddition product and therefore does not cause nonhomogeneous areas in the molded part.

As already described, the polyisocyanates can be dispersed in the polyols (a), the polyfunctional compounds (b), or mixtures of both components. If only component (b) or preferably (a) is used at the coherent phase, then polyol (a) or the polyfunctional compound (b) is incorporated into the dispersions of polyisocyanate (b), respectively (a).

In a different method used to prepare the compositions, the polyisocyanate is first treated with the deactivating agent in the presence of one or more inert solvents, and then the treated polyisocyanate which is deactivated upon the surfaces of its particles is dispersed into (a) and/or (b) components. The inert solvents can be separated from the reaction mixture after deactivation of the polyiso-cyanate or they can be separated later from the composition.

The deactivation reaction can be controlled by the addition of catalysts. Suitable deactivation catalysts are the known polyurethane catalysts used for catalyzing the polyisocyanate polyol addition reaction.

In order to prepare the compositions usable as claimed in the invention, the quantitative and equivalent ratios of the polyisocyanates to the polyols can be varied across wide ranges. For example, the ratios of free isocyanate groups to hydroxyl groups or the sum of the hydroxyl and amino groups can be varied from 0.3:1 to 60:1. Compositions which contain high concentrations of the deactivated polyisocyanates, for example those which have isocyanate-hydroxyl or isocyanate-hydroxyl plus amino group ratios of from 60:1 to 30:1, preferably from 10:1 to 6:1, can be processed directly into polyurethane and polyisocy-anurate group-containing molded parts or can be used as so-called master batch and can be diluted prior to processing with polyols or polyfunctional compounds. To prepare polyurethane molded parts it is preferable to use compositions whose isocyanate-to-hydroxyl group ratios, respectively isocyanate-to-hydroxyl plus amino group ratios range from 0.7:1 to 2.5:1, preferably from 0.9:1 to 1.2:1. The compositions from the basic components (a) through (c) are storage-stable for more than one month at 25° C., in other words, no product change which would adversely affect the intended application takes place.

To prepare the cellular or dense, optionally reinforced parts, the following additional basic components may optionally be incorporated in the compositions: (d) catalysts, (e) blowing agents, (f) reinforcing materials, (g) auxiliaries and/or additives.

(d) Suitable catalysts for accelerating the formation of urethane between the polyols, the polyfunctional compounds, optionally water, and the polyisocyanates are, for example: tertiary amines such as dimethylbenzylamine, N,N,N',N'-tetramethyldiaminodiethyl ether, bis(dimethyl-aminopropyl) urea, N-methyl- respectively N-ethylmorpholine, dimethylpiperazine, 1,2-dimethylimidazol, 1-azo-bicylo(3,3,0) octane, and preferably triethylene diamine, metal salts such as tin dioctoate, lead octoate, tin diethylhexoate, and preferably tin (IV) salts such as dibutyltindilaurate, dibutyltindiacetate, tetrabutyltindisulfide and bis-(tri-n-butyltin) oxide, as well as preferably mixtures of tertiary amines and organic tin salts, preferably used are from 0.1 to 5.0 parts by weight catalyst based on tertiary amines and/or from 0.1 to 1.0 parts by weight metal salts based on the weight of components (a), through (c).

In order to prepare polyurethane and polyiso-cyanurate group-containing molded parts, the conventional cyclization and polymerization catalysts for polyisocyanates have proven to be successful. Typical examples are: strong bases such as quaternary ammonium hydroxide, for example, benzyltrimethyl ammonium hydroxide; alkali metal hydroxides, for example sodium or potassium hydroxide; alkali metal alkoxides, for example sodium methylate and potassium isopropylate; trialkylphosphines, for example triethylphosphine; alkylaminoalkyl-phenols, for example, 2,4,6-tris(diethylamino-methyl)phenol; 3- and/or 4-alkyl-substituted pyridines, for example 3- or 4-methylpyridine; organometallic salts, for example tetrakis-(hydroxyethyl) sodium borate; Friedel-Crafts catalysts, for example aluminum chloride, iron(III)chloride, boron, fluoride, and zinc chloride, and alkali metal salts of weak organic acids and nitrophenolates, for example potassium octoate, potassium 2-ethylhexoate, potassium benzoate, potassium picrate, and potassium phthalimide. Preferably used are the strongly basic N,N',N''-tris(dialkylaminoalkyl)s-hexahydroxytriazines, for example, N,N',N''-tris(dimethylaminopropyl)-s-hexahydra-triazine.

The proper amount of catalyst needed to prepare the polyurethane and polyisocyanurate group-containing molded part depends on the effectiveness of the respective catalysts as well as on the amount of polyurethane catalysts which may optionally also be used. Generally, it has been found to be desirable to use from 0.1 to 5 parts by weight, preferably from 2.5 to 1.5 parts by weight cyclization and polymerization catalysts for each 100 parts by weight of the composition of components (a) through (c). (e) One of the blowing agents which can be used to prepare the cellular, optionally reinforcing material-containing molded parts is water, which reacts with free isocyanate groups to form carbon dioxide. The amounts of water which are generally used range from 0.1 to 2.0 parts by weight, preferably from 0.2 to 0.8 parts by weight, based on 100 parts by weight of the composition of components (a) through (c). In some cases, large amounts of water may be used.

Other blowing agents which may be used are low-boiling point liquids, which evaporate as a result of the exothermic nature of the addition-polymerization. Suitable are those liquids which are inert relative to the organic polyisocyanate and which have boiling points under 100° C. Examples of such preferably used liquids are halogenated hydrocarbons such as methylene chloride, trichlorofluoromethane, dichlorodifluoromethane, dichloromonofluoro-methane, dichlorotetrafluoroethane, and 1,1,2-trichloro-2,3,3-trifluoroethane. Mixtures of these low-boiling-point liquids with one another and/or with other substituted or unsubstituted hydrocarbons can also be used.

The most desirable amount of low-boiling-point liquid to be used to prepare the cellular molded parts depends on the density which one wishes to obtain as well as whether water is also used in some cases. Generally, amounts ranging from 1 to 50 parts by weight based on 100 parts by weight of the composition of components (a) through (c) produce satisfactory results.

(f) The reinforcing materials are essentially known conventional inorganic and organic fillers, weight-increasing substances, agents to improve abrasion resistance in paint, coating agents, etc., in particular inorganic and/or organic fibers as well as fiber-containing planar structures.

Fillers are to be understood as essentially known conventional inorganic and organic fillers, weight-increasing agents, agents to improve wear in paints, coatings etc. Typical examples are: inorganic fillers such as silicate minerals, for example fibrous silicates such as antigorite, serpentine, hornblends, amphiboline, chrysotile, talcum; metal oxides such as kaolin, aluminum oxides, titanium oxides, and iron oxides, metal salts such as chalk, barium sulfate, and inorganic pigments such as cadmium sulfide, zinc sulfide as well as glass, asbestos powder, etc. Kaolin (China Clay), aluminum silicate, and co-precipitates of barium sulfate and aluminum silicate as well as naturally occurring fibrous minerals such as asbestos and wollastonite are preferably used. Organic fillers which may be used are: coals, melamine, pine resin, addition products of melamines and/or hydrazine and monoisocyanates or monoamines and polyisocyanates, cyclopentadienyl resins, and, preferably, graft polymers based on styrene-acrylonitrile, which are prepared through in-situ polymerization of acrylonitrile mixtures in polyether polyols similar to the disclosures made in German Pat. Nos. 11 11 394, 12 22 669 (U.S. Pat. Nos. 3,304,273; 3,383,351; 3,523,093), 11 52 536 (GB No. 1,040,452), and 11 52 537 (GB No. 987,618), as well as filler polyols whereby aqueous polymer dispersions were converted to polyol dispersions.

The inorganic and/or organic fillers which can be used individually or as mixtures, are used in amounts from 0 to 500 weight percent, preferably from 0.5 to 200 weight percent, and more preferably from 5 to 150 weight percent based on the weight of the composition of components (a) through (c).

As already described, preferred reinforcing materials are: inorganic fibers such as mineral or slag wool, fibers of asbestos, boron, aluminum oxide, carbon, steel, and, preferably, glass, organic fibers such as wool, cellulose, polyester, polyamide, polyacrylic, polyvinyl alcohol, polycarbonate, and polyurethane fibers, and/or fiber-containing planar structures weighing from 100 to 1200 $g/m^2$, preferably from 150 to 900 $g/m^2$, consisting of needled or unneedled mats, nonwovens, felts, or woven fabrics of textile, synthetic, asbestos, carbon, metal, or, preferably, glass fibers, whereby the preferred glass fiber mats weigh from 100 to 1200 $g/m^2$, more preferably from 400 to 600 $g/m^2$.

The ratio of the composition of components (a) through (c) and the fibers and/or fiber-containing planar structures is selected in such a way that the fully cured molded parts contain from 0 to 90 weight percent, preferably from 10 to 70 weight percent, and more preferably from 20 to 60 weight percent of at least one reinforcing fiber or one fiber-containing planar structure, preferably made from glass fibers.

(g) The compositions as claimed in the invention can also contain auxiliaries and/or additives. Typical examples are surfactants, foam stabilizers, cell regulating agents, colorants, pigments, flame retardants, agents to protect against hydrolysis, fungistats and bacteriostats.

The surfactants which may be used are compounds which aid in homogenizing the basic materials and which may also be suitable for regulating cell structure. Typical examples are emulsifiers such as the sodium salts of castor oil sulfates or of fatty acids as well as the salts of fatty acids with amines, for example oleic acid diethylamine or stearic acid diethanolamine, salts of sulfonic acids such as alkali or ammonium salts of dodecylbenzene sulfonic acid or dinaphthylmethane disulfonic acid, and ricinoleic acid; foam stabilizers such as siloxane-oxyalkylene heteropolymers and other organopolysiloxanes, oxyethylated alkylphenols, oxyethylated fatty alcohols, paraffin oils, castor oil or castor oil acid esters and turkey red oil, and cell regulators such as paraffins, fatty alcohols and dimethylpolysiloxanes. The surfactant substances are generally used in amounts from 0.01 to 5 parts by weight based on 100 parts by weight composition.

Suitable flame retardants are, for example, tricresyl phosphate, tris-2-chloroethyl phosphate, tris-2-chloropropyl phosphate, and tris-2,3-dibromopropyl phosphate.

In addition to the halogen-substituted phosphates cited above, inorganic flame retardants may also be used to make the molded parts flame resistant, for example aluminum oxide hydrate, antimony trioxide, arsenic oxide, ammonium polyphosphate, red phosphorus, and calcium sulfate, as well as esterification products of low molecular weight polyols and halogenated phthalic acid derivatives. Generally it has been found to be desirable to use from 5 to 50 parts by weight, preferably from 5 to 25 parts by weight of the cited flame retardants for each 100 parts by weight of the composition of components (a) through (c).

Further information on the other conventional auxiliaries and additives cited above is to be found in the literature, for example the monograph by J. H. Saunders and K. C. Frisch, *High Polymers*, vol. XVI, *Polyurethanes*, pts. 1 and 2, Verlag Interscience Publishers: 1962 and 1964.

Components (d) through (g), which may also be contained in the composition as claimed in the invention, may be incorporated in the mixture of components (a) through (c) with the aid of conventional metering and mixing equipment, for example through injection or rotary mixing, and dispersed in a homogeneous manner.

In the same way, cut fibers of various lengths and diameters, for example having lengths from 100 to 400 $\mu$m, preferably from 200 to 250 $\mu$m and diameters from 5 to 20mm, preferably from 8 to 15 $\mu$m, can also be incorporated, whereby the length-to-diameter ratio is preferably greater than 30:1.

When fiber-containing planar structures are used, the composition of components (a) through (c) as well as optionally (d) through (g) may be sprayed or poured onto the planar structure or the planar structures may be impregnated with the composition, either as single or multiple layers. Since the composition does not react until relatively high temperatures are reached, the reinforcing materials, in particular fibers or fiber-containing planar structures, are best treated with the composition at temperatures lower than the curing or reaction temperatures.

The heat-curable compositions as claimed in the invention, which are storage-stable at room temperature, are used to prepare dense or cellular polyurethane, polyurea, and/or polyisocyanurate group-containing molded parts, which may be non-reinforced or may contain reinforcing materials.

The molded parts are prepared in open or closed molds, preferably in temperature controlled metal molds, for example in steel, cast iron, or aluminum molds, at temperatures from 70° to 200° C., preferably from 100° to 180° C., whereby compression factors of from 1 to 10, preferably from 1.5 to 10, preferably from 1.5 to 5, are used to prepare the cellular molded parts. The residence time in the mold depends, among other things, on the composition of the composition, the reaction temperature, and on the size and shape of the molded part. It generally ranges from 0.25 to 10 minutes, preferably from 0.5 to 2 minutes.

In order to prepare the molded parts, the homogeneous composition, having a temperature less than 50° C., preferably from 10° to 30° C., is poured into the open, preferably heated mold, and is allowed to expand and cure in the optionally open or closed mold at the cited reaction tempeatures.

In a different process, which is preferably utilized when using fiber-containing planar structures as the reinforcing material, the fiber-containing planar structure is placed in the open mold and there the composition is sprayed or poured onto the planar structure or the planar structure is saturated with said substance, or a different known method is used. Then the mold is closed and the composition is reacted at the cited temperature range of from 70° to 200° C., optionally under compression.

If desired, the molded parts can be simultaneously covered during molding and curing in the mold—when boards/plaques are produced, on 1, 2, or all sides—with a release film or decorative material. To do this, the inside walls of the open mold are covered with the cited materials, either completely or partially, then the composition is fed into the mold or first the fiber-containing planar structure and then the composition is placed in the mold. Curing or expansion and curing takes place in the manner described above.

In a different version of the process, the composition can be heated between release films to temperatures which are not high enough to produce complete crosslinking of the composition, however, which do solidify the composition enough that it can be machined. Boards or profiles produced in this manner can be cut, for example, and then finally formed and cured at a later time by means of heating to the reaction temperature, for example, in a heated compression mold.

Typical examples of non-colored or directly-colored, or printed decorative materials are: woven and nonwoven materials of plastics or natural fibers, metal foils, for example, aluminum, copper, brass, gold, or steel sheet, polyvinyl chloride, acrylonitrile-butadiene-styrene polymers, polyamide, polyester, polyethylene, polypropylene, cellulose esters or hetero esters, cardboard or continuous sheets of paper as well as thickened prepregs of unsaturated polyester resins.

The dense, optionally reinforced molded parts prepared from the compositions as claimed in the invention have a density of from 1.0 to 1.9 g/cm$^3$, preferably from 1.0 to 1.35 g/cm$^3$, and the cellular, optionally reinforced molded parts have a density from 0.5 to 1.5 g./cm$^3$, preferably from 0.2 to 0.12 g/cm$^3$.

The molded parts are used as self-supporting trim parts, reinforcing parts, or shaped objects in the railroad, automotive, and aircraft industries, for example as headliners, door and wall trim panels, instrument panels, dashboards, body parts such as fenders, spoilers, wheelhouse extensions, engine compartment shields, as well as engineering housing parts, rollers, etc. The products may also be used as trim in the furniture industry, the audio/video industry, and in the construction industry. For example, the cellular molded parts are used as arm rests, head rests, safety cushioning in automobile and aircraft passenger compartments, as well as on motorcycle and bicycle seats, seat cushions, cover layers in foam laminates, or shoe soles.

The following Examples are intended to illustrate the invention.

EXAMPLE 1

Preparation of a Stable Isocyanate Master Batch

Fifty (50) parts by weight of a dimeric uretidione group-containing 2,4-toluene diisocyanate were dispersed in 50 parts by weight polyoxypropylene glycol having a molecular weight of 2000 at 23° C. with the aid of a disperser run for 5 minutes at 1000 rpm. 1.5 parts by weight of a polyamidamine (®Euretek 505 from Schering, Berlin) were dispersed in the resulting dispersion over a period of 2 minutes. A paste-like dispersion with good flow was obtained. Said dispersion being storage-stable for more than 6 months at room temperature.

COMPARISON EXAMPLE A

The specifications of Example 1 were followed, however the polyisocyanate particles were not deactivated with the polyamidamine. The resulting pigment-like dispersion became viscoelastic after a few days and it solidified within 10 days.

EXAMPLE 2

Preparation of a Stable Master Batch

The specifications of Example 1 were followed, however the polypoxypropylene glycol was replaced by 50 parts by weight of a polyoxyethylene polyoxypropylene polyol containing glycerine as the initiator and having a molecular weight of 4600. The dispersion exhibited good flowability and was storage-stable at room temperature for more than 6 months.

COMPARISON EXAMPLE B

The specifications of Example 2 were followed, however, no polyamidamine was added. The resulting flowable paste thickened after several days aging at room temperature to form a cured-like, crumbly mass.

EXAMPLE 3

Preparation of the Storage-Stable Heat-Curable Mixture of the Invention

One hundred and sixty-eight parts by weight of a polyoxyethylene polyoxypropylene polyol containing glycerine as the initiator and having a molecular weight of 4600, 97.13 parts by weight of the master batch from Example 2, 35.6 parts by weight of a mixture of 2,4- and 2,6-diamino-3,5-diethyltoluene in a 65:35 weight ratio, 1 weight part triethylenediamine dissolved in 2 parts by weight ethylene glycol monobutylether, and 0.2 parts by weight dibutyl tin dilaurate, were mixed intensively for five minutes in a high-speed mixer (800 rpm) at 24° C. The resulting composition was storage-stable for more than six months.

COMPARISON EXAMPLE C

The specifications in Example 3 were followed, however the flowable paste from Comparison Example B was used as the master batch. The resulting composition solidified after aging two days at room temperature.

EXAMPLE 4

Preparation of a Noncellular Molded Part

Thirty (30) parts by weight of a glass fiber woven mat were placed in a heatable specialty steel mold and 50 parts by weight of the composition prepared in accordance with Example 3 was poured onto the mat. In order to assure that the woven glass fiber mat was thoroughly saturated, the mat was worked with a spatula to remove most of the air bubbles. Then the mold was closed and the composition was allowed to cure for 3 minutes at 150° C.

The part was demolded after cooling. A rigid, elastic, woven glass fiber mat-reinforced polyurethane plaque was obtained having the following characteristics:

| | |
|---|---|
| Glass Mat (%) | 23 |
| Tensile Strength (N/mm$^2$) | 29 |
| Elongation at break (5) | <10 |
| Shore D Hardness | 67 |
| Modulus of Elasticity (N/mm$^2$) | 236 |
| Impact Strength (kJ/m$^2$) | |
| −20° C. | 32 |
| +23° C. | 50 |

EXAMPLE 5

Preparation of the Storage-Stable, Heat-Curable Composition 88.7 parts by weight of a polyoxypropylene glycol having a molecular weight of 2000, 50 parts by weight of a polyoxyethylene-polyoxypropylene polyol containing glycerine as the initiator and having a molecular weight of 6500, 59 parts by weight of the master batch of Example 1, 14.84 parts by weight of a mixture of 2,4- and 2,6-diamino-3,5-diethyltoluene in a 65:35 weight ratio, 1.5 parts by weight triethylenediamine dissolved in 4.5 parts by weight ethylene glycol monobutyl ether, 0.6 parts by weight dibutyltindilaurate, 2.5 parts by weight of a 10 weight percent aqueous solution of sodium ricinine sulfonate.

The above components were mixed intensively in a high-speed mixer (800 rpm) for 5 minutes at 24° C. The resulting composition was storage-stable.

EXAMPLE 6

Preparation of a Cellular Molded Part 500 g of the composition of Example 5 was placed in a metal mold having dimensions 25×200×200 mm and was heated under compression for 10 minutes at 160° C. The result was an elastic cellular polyurethane board having a density of 0.5 g/cm$^3$.

The embodiments of the invention in which an exclusive privilege or property is claimed are defined as follows:

1. A composition which is storage-stable at room temperature and which can be heat-cured to form molded parts having polyurethane, polyurea, and/or polyisocyanurate groups, said composition containing
   (a) one or more polyols having a molecular weight of from 400 to 10,000 and a functionality of from 2 to 8,
   (b) at least one polyfunctional compound having a moelecular weight of 62 to 400 and being selected from the group consisting of aliphatic hydroxyl compounds, cycloaliphatic hydroxyl compounds, aromatic amino compounds, or mixtures thereof, and
   (c) an organic polyisocyanate which is present in the form of discrete particles, said polyisocyanate being deactivated on their surfaces and dispersed in said component (a) and (b), and depending on the product needs,
   (d) catalysts,
   (e) blowing agents,
   (f) reinforcing materials, and
   (g) auxiliaries and additives:

2. Heat-curable compositions of claim 1 wherein the organic polyisocyanate (c) is dispersed in the form of discrete particles having particle diameters from 0.1 to 150 μm in said components (a) and (b) and the polyisocyanate particles are deactivated on their surfaces, whereby from 0.01 to 20 equivalent percent of the total available isocyanate groups are deactivated and the ratio of the free isocyanate groups to hydroxyl groups or to the sum of the hydroxyl and amino groups is from 0.3:1 to 60:1.

3. Heat-curable compositions of claim 1, wherein the surface of dispersed polyisocyanate particles is deactivated by an agent selected from the group consisting of primary aliphatic amines, secondary aliphatic amines, water, compounds containing carboxyl groups, phenolic hydroxyl groups, hydrazide groups, amide groups, or alcoholic hydroxyl groups, or mixtures thereof.

4. Heat-curable compositions of claim 1, obtained through dispersing the polyisocyanate (c) in said components (a) and (b) at temperatures under 40° C., whereby at least one of the deactivating agents is incorporated in the resulting dispersions of polyisocyanate.

5. Heat-curable compositions of claim 1, wherein said compositions contain a blowing agent (e) selected from the group consisting of water and low molecular weight halogenated hydrocarbons with boiling points under 100° C.

6. Heat-curable compositions of claim 1, wherein said compositions contain a reinforcing material (f) selected from the group consisting of inorganic fibers, organic fibers, or fiber-containing mats.

7. Heat-curable compositions of claim 1, wherein said compositions contain as polyisocyanates (c), compounds selected from the group consisting of addition products of toluene diisocyanates and trimethylolpropane, trimerized toluene diisocyanates and diphenylmethane diisocyanates, and dimerized toluene diisocyanates, 4,4'- and 2,4'-diphenylmethane diisocyanates, or mixtures thereof.

8. Heat-curable compositions of claim 1, wherein said compositions contain polyfunctional compounds (b) selected from the group consisting of alkanediols having from 2 to 6 carbon atoms, alkanetriols having from 3 to 6 carbon atoms, alkyl-substituted phenylenediamines, 3,3'-di- and 3,3',5,5'-tetra alkyl-substituted 4,4'-diphenylmethanes, or mixtures thereof.

9. A process for preparing a composition which is storage-stable at room temperature and which can be heat-cured to produced molded parts containing polyurethane, polyurea, and polyisocyanate groups comprising dispersing a polyisocyanate (c) at temperatures under 40° C. in a polyol (a) having an average molecular weight from 400 to 10,000 and a functionality of from 2 to 8 and at least one polyfunctional compound (b) having a molecular weight of 62 to 400 and being selected from the group consisting of aliphatic hydroxyl compounds, cycloaliphatic hydroxyl compounds, aromatic amino compounds, or mixtures thereof, the resulting discrete polyisocyanate particles having particle diameters of from 0.1 to 150 μm being deactivated on their surface, whereby from 0.01 to 20 equivalent percent of the total available isocyanate groups are deactivated and whereby at least one deactivating agent is incorporated in the resulting dispersion of (c) and (a) and (b).

* * * * *